No. 735,545. PATENTED AUG. 4, 1903.
L. MAYHEW.
FLOATING FISH TRAP AND SET NET.
APPLICATION FILED SEPT. 10, 1902.
NO MODEL. 2 SHEETS—SHEET 2.
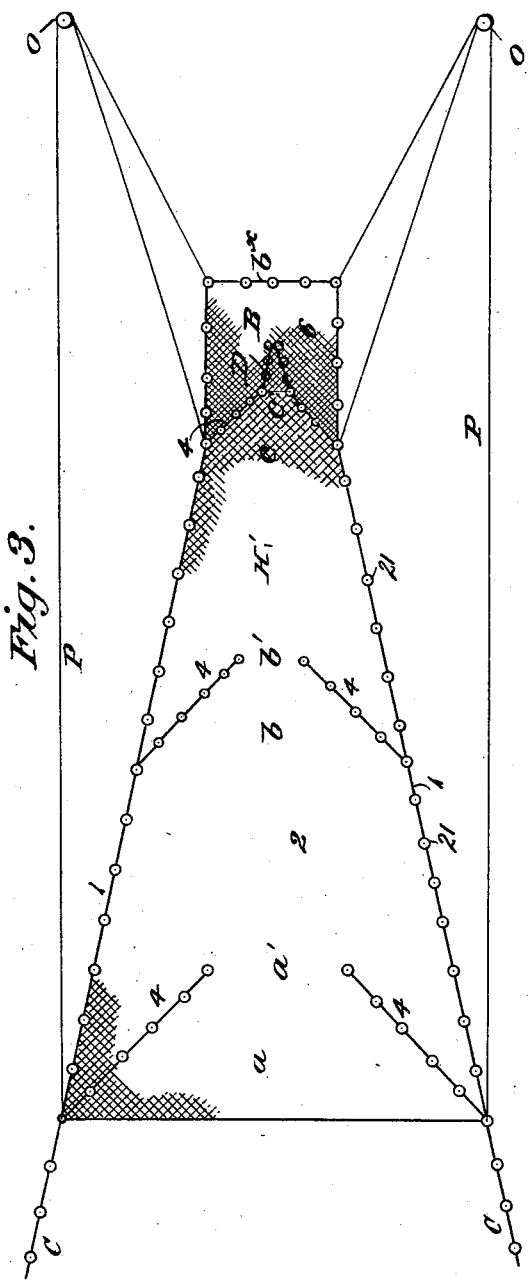
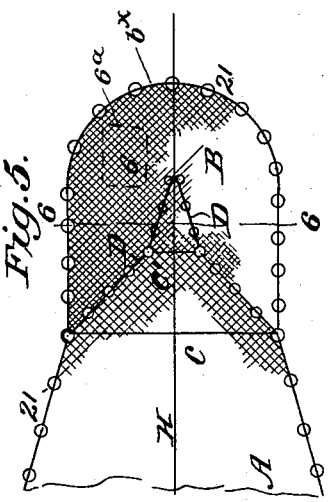
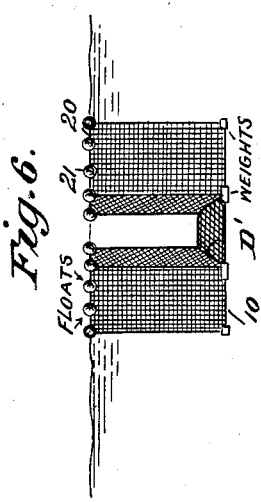
WITNESSES:
Lee B Nemou
Guy Worthington
INVENTOR
Lewis Mayhew
BY
Fred G. Dieterich & Co.
ATTORNEYS No. 735,545. Patented August 4, 1903.

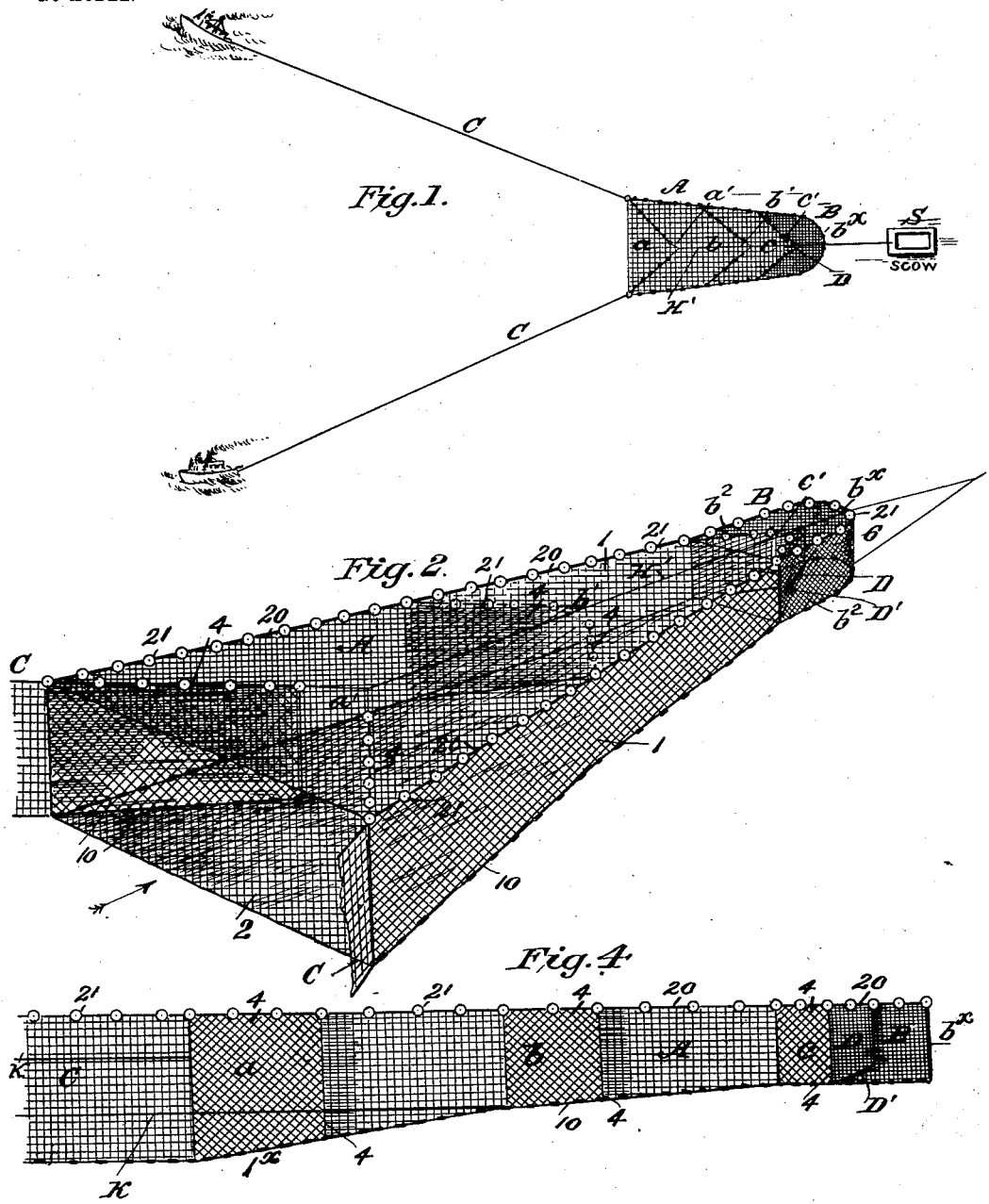

UNITED STATES PATENT OFFICE.

LEWIS MAYHEW, OF WHATCOM, WASHINGTON.

FLOATING FISH-TRAP AND SET-NET.

SPECIFICATION forming part of Letters Patent No. 735,545, dated August 4, 1903.

Application filed September 10, 1902. Serial No. 122,866. (No model.)

*To all whom it may concern:*

Be it known that I, LEWIS MAYHEW, residing at Whatcom, in the county of Whatcom and State of Washington, have invented a new and Improved Floating Fish-Trap and Set-Net, of which the following is a specification.

My invention is in the nature of an improved combined floating fish-trap and set-net, and it comprehends generally an appliance of this kind composed entirely of webbing, no framework whatever being utilized for holding it in shape and having such correlative arrangement of parts whereby when towed through the water at a moderate rate of speed it is held in an operative condition by frictional contact with the water, and the said parts include a novel combination of leads of large mesh which offer a minimum frictional resistance and a series of hearts and a pot of finer mesh which offer a maximum frictional resistance, whereby to materially aid in holding the leads comparatively straight.

In its more complete nature my invention also comprehends a novel arrangement of leads, a plurality of hearts, a single collecting-pot, and an apron, and subordinately it embodies certain details of construction and peculiar combination of parts, all of which will hereinafter be fully explained, and specifically pointed out in the appended claim, reference being had to the accompanying drawings, in which—

Figure 1 is a diagrammatic view illustrating my invention in use as a floating fish-trap. Fig. 2 is a perspective view of the same. Fig. 3 is a top view of my invention arranged as a set-net. Fig. 4 is a longitudinal section thereof. Fig. 5 is a view of the form of pot used when the appliance is employed as a floating trap. Fig. 6 is a cross-section on the line 6 6 of Fig. 5.

In the practical construction my invention embodies a main or body portion A in which is contained the hearts, a pot or crib B at the contracted end of the body, and the leads C C for guiding the fish school toward the hearts within the body or main part A.

The entire trap in my construction is composed of webbing, no framework of any kind being used to hold it in shape, the several parts being so combined and held to coöperate in such manner that when towed through the water at a moderate speed the said parts are properly sustained by their frictional contact with the water.

The body portion A comprises the convergingly-disposed sides 1 1 and an apron or bottom 2, and the said sides at their forward end increase in depth from the middle heart to the entrant end of the first heart, as indicated by $1^\times 1^\times$, the purpose of which is to prevent the fish as they approach the entrance to the first heart from going down underneath the trap, and to further cause the fish to properly enter the first heart the apron or bottom 2 may extend out some distance between the leads C, which latter can be of any desired length, about five or six hundred feet being usually employed for catching large fish. The hearts, of which three are shown, (designated by $a\ b\ c$,) although a greater or less number may be employed, each consist of a pair of oppositely-converging transversely-disposed sections 4 4, having the same height as the sides 1 1, and the adjacent ends of the several hearts $a\ b\ c$ are arranged to produce contracted throats or passage-ways $a'\ b'\ c'$, which progressively decrease in width, the one, $c'$, which leads into the pot or crib being the smallest.

The pot or crib B is formed by continuing the rear ends of the sides 1 1 in parallel planes, as indicated by $b^2\ b^2$, and joining the extremities of the said ends, whereby to form a cross portion $b^\times$, which when the apparatus is used as a floating fish-trap is made semicircular, as shown in Figs. 1 and 2; but when utilized as a set-trap the part $b'$ extends square across, as shown in Fig. 3. The part B may be made as an integral part of the sides 1 1; but I prefer to detachably join the pot B to the said sides, whereby a round or a square pot may be connected to the said sides, as conditions may make desirable. Within the pot B is also fitted a short tunnel-section D, which forms an extension of the passage or throat $c'$ of the inner heart $c$, and this tunnel has a part D', that inclines upwardly from the bottom of the pot, whereby to give the tunnel freedom to swing vertically and also to provide a free space under it in which the trapped fish may circulate.

When used as a floating trap, the pot B is covered by a fine netting 6, having a suitable opening 6ª (indicated in dotted lines in Fig. 5) for the removal of the fish, which is laced up during fishing. The leads C C in practice are also detachably joined with the hearts or body portion A. The lower horizontal strands 10 of the side portions, the leads, and the pot are weighted to maintain the said parts in a proper vertical position, and the upper horizontal strands 20 of the said leads, the pot, and the heart-sections have floats 21 for sustaining the entire apparatus at a proper floating depth in the water.

As before stated, the entire apparatus is composed of webbing and the parts held in a proper correlative position when towed through the water by frictional contact therewith. Such condition of parts is effectively accomplished by making the leads of a large mesh, so as to present a minimum resistance in pulling through the water, and the hearts and the pot portions of a much finer mesh, whereby the said parts will offer a greater frictional resistance than the leads, and by reason thereof when a pull strain is applied to the leads the hearts and the pot portions by reason of their increased frictional resistance will have a drag or anchoring effect, and as the leads' strain is on opposite sides of the front and in diverging directions the hearts and the pot portions will be held properly distended and in a practically semirigid condition without the aid of rigid framework. The distended condition of the hearts and the pot may be further augmented by an additional drag or anchor attached to the center of the back end of the pot. This when using the apparatus as a floating trap may be an ordinary scow S, as shown in Fig. 1.

H H designate stay-lines on the bottom of the portion A and the pot B, and similar stay-lines H' are used on the top, and the latter stay-lines may be in the nature of a fine-wire cable, similar in size to the ordinary clothes-line. The entire apparatus is so arranged that it can be conveniently carried on the scow, and when a school of fish is sighted the entire outfit can be thrown into the water, and by reason of its peculiar construction the same in a very few minutes adjusts itself ready to trap the fish.

My trap is especially well adapted for salmon fish, but it is manifest it may well be utilized for catching smaller fish. In Fig. 3 I have shown my improved fish-catching apparatus arranged as a set-net. In this form the construction of the apparatus is the same as before described, except that a square pot is used instead of a round one, and to properly anchor the pot end two piles O O, suitably distanced, are used to form a connection for the stay-lines P P, that join with the pot and the front end of the body or main portion, as shown. In this latter arrangement the outer ends of the leads C C are also joined to a pair of piles, (not shown,) and when thus set the pot needs no top, and by simply loosening the lines P P the back end of the pot will be sufficiently slackened to permit taking out the fish without interfering or stopping the hearts from fishing.

When the apparatus is to be pulled by a direct or central draft, supplemental leads K K' are used in addition to the leads C C, and the said leads K K' are preferably joined with the trap at the points indicated in Fig. 4.

Having thus described my invention, what I claim, and desire to secure by Letters Patent, is—

A fish trap or net, comprising a body portion A, consisting of converging sides 1, the top and bottom, the oppositely-disposed converging heart-sections connected to the inner face of the sides 1, the pot B, the latter comprising sides and an end portion, the sides forming parallel extensions of the sides of the body A, the innermost heart-section extending within the pot, a tunnel forming a part of the pot joined with the discharge-throat of the inner heart-section, said tunnel having an upwardly-inclined bottom, and the divergingly-extended leads, connected to the sides of the body A, all of the said parts being composed of webbing, the leads of a large mesh, the body A, the hearts and the pot of a fine mesh, the inner horizontal strands of the webbing being weighted, the upper horizontal strands having attached floats, all being arranged substantially as shown and for the purposes described.

LEWIS MAYHEW.

Witnesses:
SANFORD B. MAYHEW,
EDWIN W. DOUGLASS.